F. A. FAHRENWALD.
COMPOSITION OF MATTER FOR PLATINUM SUBSTITUTE IN CHEMICAL APPARATUS AND OTHER USES AND METHOD OF MAKING SAME.
APPLICATION FILED NOV. 6, 1916.
1,415,233.   Patented May 9, 1922.
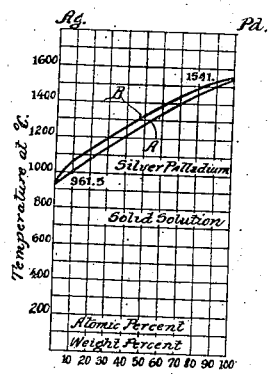
Fig. 1.
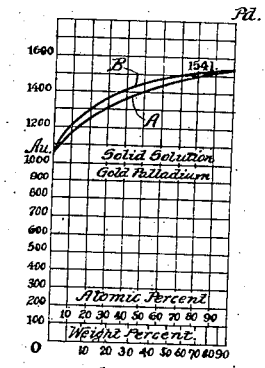
Fig. 2.
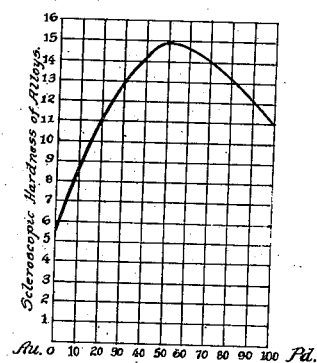
Fig. 3.
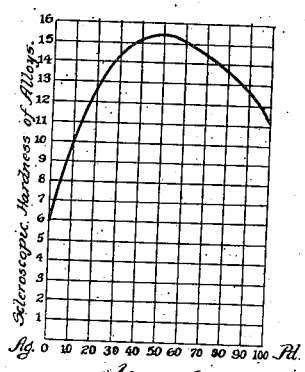
Fig. 4.
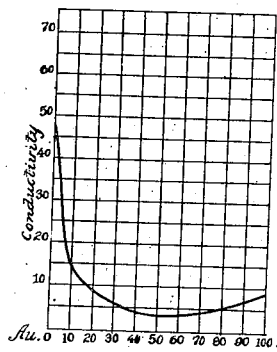
Fig. 5.
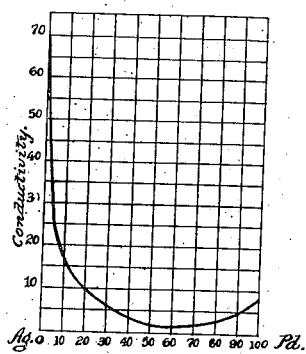
Fig. 6.
Fig. 7.
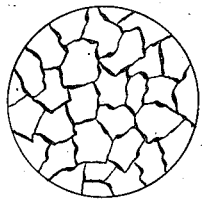
Fig. 8.
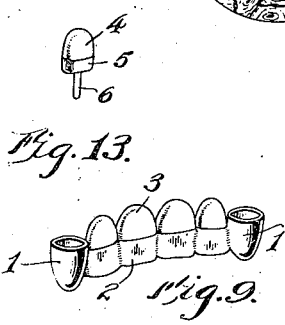
Fig. 13.  Fig. 10.  Fig. 12.
Fig. 9.  Fig. 11.
Inventor,
Frank A. Fahrenwald.

UNITED STATES PATENT OFFICE.

FRANK A. FAHRENWALD, OF CLEVELAND, OHIO, ASSIGNOR TO THE RHOTANIUM COMPANY, OF CLEVELAND, OHIO, A CORPORATION OF OHIO.

COMPOSITION OF MATTER FOR PLATINUM SUBSTITUTE IN CHEMICAL APPARATUS AND OTHER USES AND METHOD OF MAKING SAME.

1,415,233.  Specification of Letters Patent.  Patented May 9, 1922.

Application filed November 6, 1916. Serial No. 129,911.

*To all whom it may concern:*

Be it known that I, FRANK A. FAHRENWALD, a citizen of the United States, residing at Cleveland, in the county of Cuyahoga and State of Ohio, have invented certain new and useful Improvements in and Relating to Composition of Matter for Platinum Substitute in Chemical Apparatus and Other Uses and Methods of Making Same, of which the following is a specification.

This invention relates to an improved composition of matter produced to form a substitute for platinum and for certain alloys of platinum which are even rarer and more expensive than platinum itself. In the field of dentistry, alone, tremendous amounts of platinum (estimated at fully one-third of the annual world supply) are used up and, by the very nature of the case, irrevocably lost. Spark points and terminal devices for electric appliances employ even more than dentistry, and the greater part of this is lost. Chemical and philosophical instruments and jewelry utilize most of the remainder, and while the platinum devoted to these uses is not generally lost, yet its wide distribution renders it unavailable. The great increase in the use of platinum which has occurred during the last few years by reason of an unprecedented increase in the use of sparking appliances (as in explosion engine ignition, X-ray machines, high tension appliances, wireless telegraph installations, and the like) has so enlarged the use of platinum that its price has increased to a point which renders it almost prohibitive.

For several years I have experimented for the purpose of finding a suitable substitute for platinum in each of these uses, though not at first with the expectation that any single metal or alloy would fulfill the requirements of these three diverging classifications; and while I have in fact discovered a substitute for platinum as to each of the categories above mentioned in the alloys of a single metal, and in a certain peculiar treatment or manipulation of such alloys, so that from this aspect the entire discovery may be considered as one invention; yet on the other hand the divergence in the requirements of these three classifications rendered it uncertain except by experiment that any one composition of matter would fulfill the requirements of all, and in fact different compositions and proportions are found to be desirable for the different uses even though a single basic metal be present in each, wherefore the inventions from this aspect are separate and independent.

The objects of my invention may therefore be stated under the following heads:

*Dentistry.*

Platinum is used in dentistry in the form of foil, rods, wires, and sheets for bridges, plates, crowns, and pins for which purposes its high melting point, pliability, chemical resistance, and ease of soldering it render it invaluable. Stiffness is imparted to it by alloying with iridium or the like. As to dental applications my object has been to produce an alloy of a smaller cost having equal pliability, chemical resistance and ease of soldering, combined with a sufficiently high melting point for the purpose stated; such a material I have found in the alloys of palladium with gold or silver in the proper proportion, especially when subjected to a certain treatment or manipulation hereafter described. So far as dental uses are concerned, the alloys of palladium with gold surpass those of palladium with silver in the same way that gold surpasses silver, although the presence of palladium affords to the gold a certain hardness and rigidity and to the silver a certain chemical inertness which materially improves each for the purpose in view, provided with a true and homogeneous solid-solution condition be secured.

*Spark points and electrical contacts.*

It has been the usual practice heretofore to provide a contact device for a spark point in electrical apparatus of the better sort with a terminal facing or cap of platinum in order to insure that such facing or cap will remain clean, smooth, and unaffected by electrical sparks which may be formed between such terminal facings, and will simultaneously resist melting, oxidation, or other chemical action by reason of the high temperature to which it is sometimes subjected. The constant hammering or vibration to which devices of this nature are ordinarily subjected tends to deface and deform the same seriously, particularly at high temperatures, wherefore it has sometimes been the practice to alloy a certain percentage of iridium with the platinum in order to augment its hardness and extend the permissible temperature range. In certain of the cheaper varieties of electrical apparatus silver terminals have sometimes been used, but pure silver is not well suited to this use owing to its physical softness, its low melting point, and its high vapor tension which renders arcing very easy and very objectionable.

I have found that if palladium be alloyed with the silver, and particularly if the alloys so produced be subjected to certain treatments hereinafter described, the resulting material has important advantages over any other spark point material heretofore known excepting the most expensive substances. When these two ingredients are uniformly combined together in a homogeneous, solid-solution alloy, the effect of the palladium is to increase the hardness and elevate the melting point and decrease the vapor tension to such an extent that the objectionable qualities of silver are entirely overcome and spark points of great permanence and reliability are secured. The excellence of the material depends to a considerable extent upon the proportion of palladium employed, an alloy containing from twenty per cent to forty per cent of palladium ordinarily yielding the greatest amount of satisfaction in comparison to the price paid; although the obtaining of this alloy in a homogeneous, solid-solution is fully as important and considerably more difficult than the proportioning.

An alloy of palladium and gold, when subjected to the same manipulations, is even more permanent and satisfactory, although the additional advantages secured do not, always perhaps, compensate for the increased cost when applied to this use, at least under ordinary conditions of use.

*Chemical ware, philosophical purposes and jewelry.*

Platinum is used with these arts in the form of foil, wire, dishes, crucibles, plates, bars, etc., and its most important qualities are its permanence, its high melting point, and its chemical resistivity. I have discovered that an alloy of palladium with gold in the proper proportions and subjected to a suitable manipulation whereby homogeneity is secured, possesses a melting point and a chemical resistivity and a permanence almost if not quite equal to platinum itself; and that alloys of palladium with silver, when similarly treated, can be employed for philosophical purposes and jewelry in practically all instances, and for chemical ware in some instances where the requirements of resistivity and infusibility are not too exacting.

*The invention generally.*

In the drawings accompanying and forming a part of this application I have illustrated graphically certain of the purposes and peculiarities of the alloys mentioned. In these drawings, Fig. 1 represents the thermal-equilibrium diagram of the gold-palladium series, and Fig. 2 a similar diagram of the silver-palladium series; Fig. 3 illustrates the hardness curve for the gold-palladium series and Fig. 4 a similar curve for the silver-palladium series; Fig. 5 illustrates the conductivity (thermal and electrical) of the gold-palladium series, and Fig. 6 the conductivity curves of the silver-palladium series; Fig. 7 represents a photomicrograph section showing the normal segregation of palladium from its alloys with gold or silver; Fig. 8 represents a photomicrograph section of any alloy of these metals after the performance of my improved process thereon; Fig. 9 illustrates a bridge for dental use constructed of my improved gold-palladium alloy, the same being one example of a dental use; Fig. 10 illustrates a pair of spark points constructed of my improved silver-palladium alloy; Fig. 11 illustrates a chemical utensil of my improved material; Fig. 12 illustrates a ring made of a pair of intertwined members formed, respectively, of my improved gold-palladium and silver-palladium alloys, being one example of a use in jewelry; and Fig. 13 shows an individual tooth complete with cup and pin.

Referring first to Figs. 3 and 4, it will be seen that the hardness of the alloy is greater in each case than the hardness of either constituent, being a maximum substantially at the time that the two metals are present in equal atomic proportions. Referring to Figs. 5 and 6 it will be seen that the conductivity of the alloy is in each case much less than the conductivity of either of its component metals, the curve showing a very decided slope at each end, indicating a sudden increase of resistance caused by the admixture of a small amount of the other metal.

Reference to Figs. 1 and 2 will indicate that the fusing points of neither alloy is very clearly defined, the two curves A and B indicating the solidus and liquidus conditions, respectively, between which the fusion in incomplete, one of the ingredients being softened and the other not materially affected. The range between these conditions is comparatively small, and in every case the melting point of each ingredient is decidedly increased by the presence of the other ingredient, showing that in every instance there is some actual combinattion between the two metals in the form of an intersolution.

However Fig. 4, which is a photomicrograph section of an alloy of approximately palladium forty per cent and silver sixty per cent, indicates exactly the condition which the separation of these lines would lead to be expected, namely that while passing through the range from liquidus to solidus the palladium solidified rather in advance of the silver so that the alloy consists of a mass of nucleated crystals, their centers consisting of comparatively pure palladium merging through varying degrees of alloy to a condition of comparatively pure silver at the margins of the crystals. The closeness between the solidus and liquidus curves indicates that neither the nucleus nor the margin of the crystal consists of pure metal, each being alloyed to some extent with the other; although inspection indicates the same thing which experience verifies, namely that spark points or other devices made from an alloy in the condition shown in Fig. 4 will represent a lower grade of alloy than its actual composition would indicate, since the segregation of the palladium tends by this extent to destroy its usefulness. Thus spark points or other devices made from alloys in this condition will promptly become etched and irregularly attacked, the nuclear portions of the crystals being affected in slight degree if at all, the remainder of the crystal showing deep pitting.

I have discovered that if any alloy of nucleated crystals as illustrated in Fig. 4 be subjected for a considerable period of time to a uniform elevated temperature less than the point of fusion of the less refractory metals the nuclei will become absorbed in the crystals and disappear and an alloy of homogeneous uniform composition will result. If this heat treatment be continued for a sufficiently long time the composition of each crystal may be made entirely homogeneous, although a crystalline structure will still remain; and while I do not guarantee the truth of the theory, but rather base my claims upon the facts observed, yet the appearance is as though the greater freedom of movement and kinetic energy possessed by the molecules of the two metals at an increased temperature caused or permitted those molecules to interpenetrate and become bound up with each other in a homogeneous solid solution even though the temperature be maintained constantly as less than the fusing point of either ingredient. This, view is corroborated by the fact that the same homogeneity can be secured either by heating for a short time at an elevated temperature or for a longer time at a lower temperature; and while there may be a minimum temperature below which no rearrangement takes place within any length of time I have not definitely established this fact since its exact determination is a very slow matter because of the interrelatiton of the time and temperature factors. At a temperature near the melting point of the more fusible homogeneous constituent this diffusion will take place in a few minutes; in fact at any temperature above 800° C. a half hour is generally sufficient for the treatment. At a temperature of 500° C. to 600° C. this diffusion will take place in the course of a few days, depending upon the percentage composition, crystal size, etc. At room temperatures the absorption is so slow as not to be detectable and perhaps is entirely arrested in the case of the alloy specifically described herein; although in the case of other metals this nuclear absorption will become observable at lower or higher temperatures depending upon the melting points, relative atomic sizes, and percentage compositions of the metals.

The segregation herein mentioned is observable as a rule only in the case of metals which possess considerably different melting points and considerably different atomic volumes. Thus palladium when alloyed with silver or gold in a proportion of more than about ten per cent of palladium begins to show this nucleation very clearly; the melting point and atomic volume of palladium are the higher. When alloyed with platinum the nucleation is less apparent; while gold, silver, and copper can be fused together in any desired proportion without any appearance of nucleation, these metals having very similar melting points and atomic volumes.

The percentage composition also determines the amount of nucleation to some extent and, to a less degree, the difficulty of diffusion. Below five per cent of palladium I have never observed segregation, and below ten per cent of palladium nucleation is rare and seldom harmful. Above ten per cent nucleation rapidly increases so that a true homogeneous, solid solution alloy of palladium with either gold or silver is improbable without precautions for diffusion.

While Fig. 7 is primarily a representation of the condition which occurs in alloying palladium with silver, a similar condition occurs in alloying palladium with gold and is curable by identically the same thing. Whichever elements be used and in whatever proportion, I prefer to cool the alloy from the molten state in a rather rapid manner, as by casting into ingots in a chilled mold, from the fact that the resulting crystals are of smaller and more uniform size and the degree of nucleation is not so great. Furthermore the diffusion of these nuclei is more easily affected by reason of the larger initial distribution of the palladium. It will be understood that the heat treatment above described has no effect (or at least no intended effect) upon the size, shape or location of the crystals themselves, but merely gives rise to a rearrangement and uniform distribution of the substances contained within the confines of the separate crystals. A slow cooling of the alloy through the liquidus condition frequently gives rise to a very gigantic crystal growth with equally pronounced nucleation which is overcome only with much greater difficulty.

The advantages of my improved alloy for dental use and the requirements of the same have already been pointed out; it will be clear that the maximum advantage will be obtained only when the ingredients are uniformly diffused scattered throughout the entire mass, since otherwise the excellence of the material will be determined by the condition of its poorest region.

For use in spark points and other electrical contacts, while it is true that the thermal and electrical conductivity of the alloy are somewhat less than that of either metal, still by making the spark points of wide cross-section and comparatively short depth as shown in Fig. 6, sufficient conductivity can be secured for any possible use, besides which the conductivity of this alloy compares favorably with that of platinum or platinum-iridium. For ordinary uses an alloy containing twenty per cent (20%) of palladium and eightly per cent (80%) of silver is entirely satisfactory, when the palladium has been distributed uniformly throughout the mass by heat treatment as above described, and for such heat treatment I recomment first chilling the alloy and then reheating for not less than about one-half hour to a temperature of not less than about 800° C. The cost of this alloy at present prices of materials would be less than $5.00 per cubic centimeter as against gold at $12.50 per cubic centimeter and platinum at about $75.00 per cubic centimeter. I do not advocate the use of an alloy for this purpose containing less than twenty per cent of palladium, but in case a harder and more resistant material be desired the percentage of palladium can be up to a maximum of fifty per cent at which the cost of the alloy per cubic centimeter will be approximately $10.00 which is still far less than that of platinum. Reference to the drawings will show that an increase above this point will produce no advantage commensurate with the increased cost of the alloy, since palladium at the present state of the market is worth approximately one hundred times the expense of silver (either by weight or by volume). Besides if the proportion of palladium be increased above this point, the hardness and mechanical strength of the alloy decreases.

If a more resistant material is required than is produced by an alloy of equal parts of palladium and silver, I recommend the employment of a suitable palladium-gold alloy or the replacement by gold of a part of the silver in the alloy described herein. For example an alloy of equal parts of palladium and silver will cost approximately $10.00 per cubic centimeter and melt at approximately 1300° C. The same melting point can be secured with an alloy consisting approximately of gold eighty atomic per cent, palladium twenty atomic per cent (approximately equivalent to Au 88., Pd 12 by weight) at a cost of approximately $14.00 per cubic centimeter.

In the practical uses shown in the drawings, Fig. 9 illustrates a bridge for dental work, 1—1 representing anchorages and 2 a bar connecting the same, both made of one of the alloys herein described, and carrying the artificial teeth 3—3.

In Fig. 13, 4 represents a single artificial tooth secured in a socket or base 5 of my improved alloy, and 6 represents a pin which may be made entirely of the same or may be of some baser metal and coated with this alloy.

Fig. 10 illustrates a pair of spark points, wherein 7—7 represent the carrying devices, which may be either rigid or flexible, and 8—8 represent the terminals, which are made of my improved alloy.

Fig. 9 illustrates a dish or crucible for chemical use, which, of course, is merely representative of one shape in which my alloy can be worked or used.

By the words "noble metals" in these specifications and claims I mean gold, silver, or platinum in accordance with the usual significance of these words.

While I have particularly referred to the binary alloys of palladium with other of the noble metals, it is to be understood that I do not confine myself to an alloy of two ingredients, but may employ other constituents in addition to those herein mentioned. It will also be understood that the herein described method of overcoming nucleation is not limited to alloys of palladium with gold or silver, or even to alloys of one of these metals with some third metal, but may be extended to the treatment of binary or ternary alloys of wholly different composition wherein this phenomenon is present. Also I do not confine my improved alloys to merely the uses herein specifically mentioned which are intended to be merely illustrative of the great field which exists therefor.

By the term "palladium" as used herein I mean the commercial material which contains on the average about one-half of one per cent of platinum as an impurity and frequently other noble metals as gold, iridium, and rhodium; this commercial palladium is very rarely wholly free from platinum and in exceptional instances has run as high as five per cent of this material. I have always ignored this noble metal impurity as not injuring the product, but my claims must be construed as regardless of the inclusion of these noble metals in small quantities all of which generally occur as impurities in commercial palladium.

Having thus described my invention what I claim is:

1. An article of chemical apparatus consisting of an alloy of a noble metal in the periodic group containing gold combined with not less than about twenty atomic per cent of palladium in homogeneous solid solution.

2. The method of alloying palladium and a noble metal in a homogeneous solid solution which contains, as a step, maintaining the alloy for a considerable time at an elevated temperature less than the melting point of either constituent until the crystalline nuclei are dissipated.

3. In the method of producing a homogeneous alloy of a noble metal and palladium, the step which consists of maintaining the solidified alloy for a period of not less than about one-half hour at a temperature not less than about 800° C. nor more than the fusing point of the alloy.

4. The process of overcoming nucleation in alloy crystals which consists of maintaining the solidified alloy at a temperature slightly less than its melting point until the molecules of the metal have interpenetrated and a homogeneous solid solution produced within the boundary of each crystal.

5. The process of overcoming nucleation in an alloy of palladium and a noble metal having a melting point less than that of palladium which consists in maintaining the alloy for not less than about one-half hour at a temperature not higher than the softening point of the alloy and not lower than about 800° C., the time of treatment increasing proportionately to decrease of temperature or decreasing proportionately to increase of temperature.

6. The process of producing a homogeneous solid solution alloy of palladium and one of the noble metals of lower melting point which consists in first fusing the same together in the desired proportions, second chilling the alloy quickly, and third, reheating the alloy for not less than about one-half hour to a temperature of not higher than the softening point of the alloy and not lower than about 800° C.

7. A utensil for chemical use consisting of an alloy of palladium and one or more of the noble metals of lower melting point in homogeneous solid solution, wherein the palladium forms not less than about 20 atomic per cent of the whole.

8. A container for laboratory use consisting of an alloy of palladium 10 to 40 per cent and gold 90 to 60 per cent in homogeneous solid solution.

9. Chemical apparatus having a working surface consisting of an alloy of palladium and one or more of the noble metals gold or silver in homogeneous solid solution, wherein the palladium forms between 10 and 40 per cent of the whole.

10. A heat and chemical resistant ware formed of a metal alloy of approximately 80% gold and 20% palladium.

In testimony whereof I affix my signature.

FRANK A. FAHRENWALD.